UNITED STATES PATENT OFFICE.

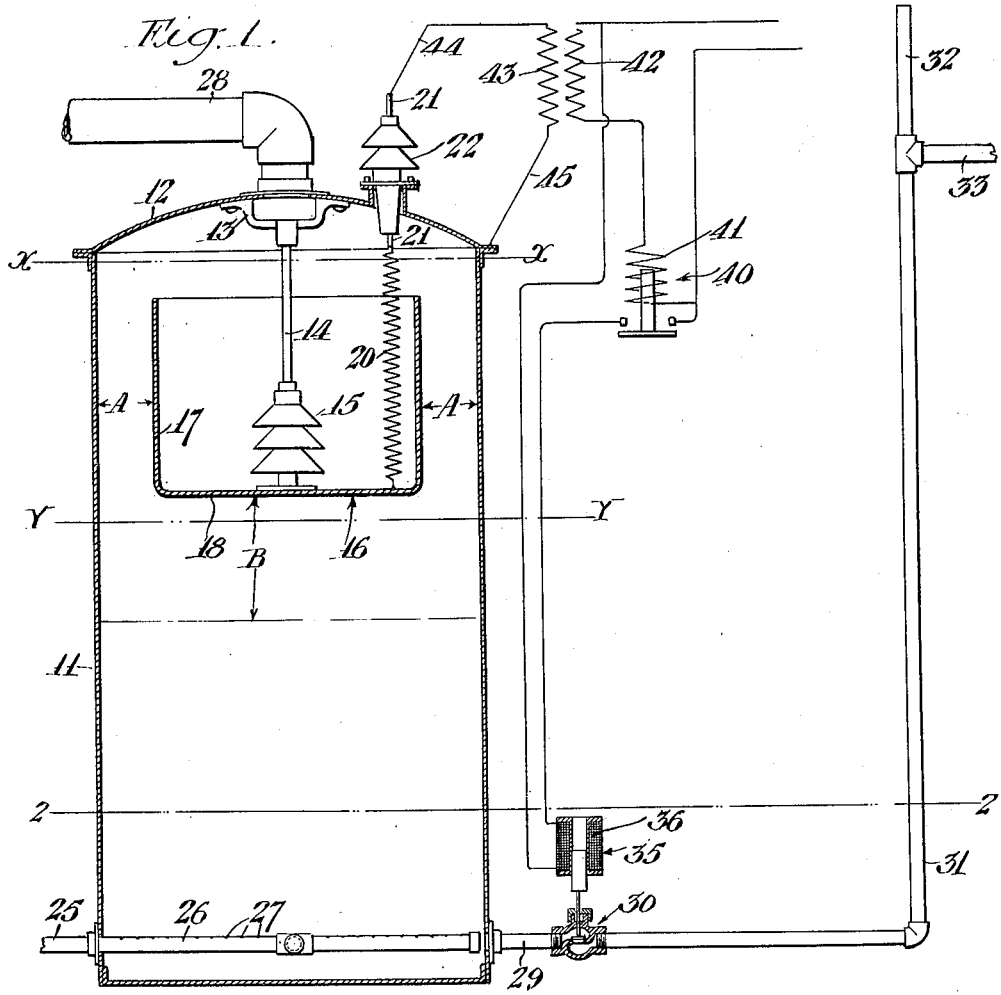
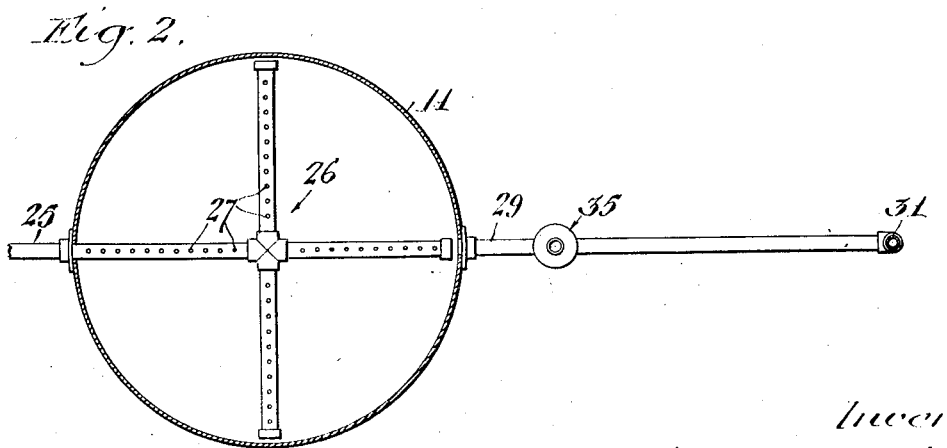

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

SYSTEM OF WATER CONTROL FOR ELECTRICAL DEHYDRATORS.

1,405,120.    Specification of Letters Patent.    Patented Jan. 31, 1922.

Application filed July 8, 1919. Serial No. 309,457.

*To all whom it may concern:*

Be it known that I, FORD W. HARRIS, a citizen of the United States, residing at Los Angeles, in the county of Los Angeles, State of California, have invented a new and useful System of Water Control for Electrical Dehydrators, of which the following is a specification.

My invention relates to the art of dehydrating by means of electric current, the principal object being to provide a dehydrator which will be suited to handle oils having a widely varying water content.

Further objects and advantages will be made evident hereinafter.

Referring to the drawings, which are for illustrative purposes only,

Fig. 1 is a side elevation partly in section in the embodiment of my invention.

Fig. 2 is a plan view on a plane represented by the line 2—2 of Fig. 1.

In the embodiment of my invention illustrated in these drawings a tank 11 is provided, this tank having a tight top 12 on which is supported, by means of a bracket 13, a rod 14 which supports an insulator 15. The insulator 15 supports an electrode 16, which has the form of a hollow cylinder 17, having a tight bottom 18. The electrode 16 is connected through a flexible wire 20 with a conductor 21, which passes through the top 12, being insulated therefrom by means of insulator 22. Emulsion to be treated is supplied through a pipe 25, which communicates with a cross 26 located in the bottom of the tank and provided with perforations 27. Oil is withdrawn from top of tank through a pipe 28. A water outlet pipe 29 is provided, having a valve 30, this pipe 29 connecting with a vertical pipe 31, which has an open vent 32 and a discharge pipe 33, which leads to suitable drain. The valve 30 is controlled by a solenoid 35, which has a core 36, the core 36 being raised when the solenoid is energized, thus opening valve 30 and allowing the water to escape through pipes 29, 31 and 33. The solenoid is controlled by relay 40 which has a coil 41 connected in circuit with a primary 42 of a transformer, which also has a secondary 43. One terminal 44 with secondary 43 is connected with conductor 41, the other, 45 being connected with the tank 11.

The method of my invention is as follows:

The tank 11 being filled with emulsion, a current being supplied to the primary 42, an electro-motive force is impressed between electrode 16 and the tank 11, a primary field being set up in the annular space "A" surrounding the cylindrical wall 17 and the electrode 16. The effect of this electro-motive force is an agglomeration of water particles which fall to the bottom of the tank, thus building up a supply of water therein. The tank may at the start be conveniently filled up to the level denoted by the line $x-x$ of Fig. 1, this level being slightly below the level of the pipe 33. As a result, even if the valve 30 is open, no water will be discharged from the bottom of the tank, the dehydrating continuing until the oil in the top of the tank is fairly free from water containing, for example, not over three per cent of water. The remainder of the water originally in the oil will have been previously deposited in the bottom of the tank. Under these conditions, namely, with dry oil on top of the tank, and the water level near the bottom, say at the level 2—2, the current will be so low in the primary 42 that the relay 40 will be in the position shown in Fig. 1 with its contacts open and the solenoid 35 will be in the position shown with its core 36 in its lowest position. Under these conditions the valve 30 will be closed. This completes the operation of starting the dehydrator which thereafter will work continuously in the following manner:

Oil being supplied through the pipe 25 passes through the perforations 27, passing upwardly through the water in the bottom of the tank and rising on the surface thereof into the space between the bottom 18 of the electrode 16 and the surface of the water. While the main field under these conditions is maintained between the outer surface of the cylindrical wall 17 and the inside of the tank or in the space "A", there is also a secondary field which may be denoted by "B" between the bottom 18 of the electrode 16 and the surface of the water. As additional oil is supplied this oil rises into the field "B" and as the water continues to accumulate the distance that the current has to pass between the bottom 18 and the surface of the water is continually diminished as the water level rises. As a result, the current flowing through the primary 42 will be increased more or less in proportion to the rise of the water level. Whenever this current reaches a pre-determined value the relay 40 is actuated, the contacts of the relay closing the circuit to the solenoid 35 and opening the valve 30. Water then flows through the pipe 29, the valve 30, the pipe 31 and the pipe 33, these pipes being of sufficient area to more than compensate for the amount of water in the emulsion which is being supplied through the pipe 25. As a result, the water level falls and the distance the current has to travel through the secondary field "B" is increased with the result that the current in the primary 42 falls. When this current reaches a certain minimum the relay 41 opens, thus de-energizing the solenoid 35 and closing the valve 30.

I have found that there is a decided tendency for emulsion to stratify in a treater, the emulsion immediately above the surface of the water being very high in water and the water content gradually diminishing to the top of the tank. As a result I have found that the character of the emulsion in the primary field "A" as regards this water content may be varied by changing the water level, so that the changes in the water level not only control the current flowing through the secondary field 23 but also control the current flowing through the primary field "A".

It will be seen that by the use of my invention I am able to maintain the electric current on the treater constantly and it will further be evident that the treater will be self-regulating. That is to say, that if an emulsion containing very little water is supplied to the treater the water level will be maintained very high and the major portion of the current will flow through the secondary field in which case the water level may even be as high as the level Y—Y of Fig. 1. If, on the other hand, a very wet emulsion is being supplied, the water level is maintained very low and the major portion of the dehydrating current flows in the primary field. In either case the water is automatically drained and the current is automatically kept constant through very wide limits of the water content in the emulsion supplied.

I claim as my invention:

1. A dehydrator comprising a tank; an electrode in said tank; insulators insulating said electrode from said tank; means for impressing an electro-motive force between said electrode and said tank; means for introducing an emulsion into said tank; a water outlet pipe connected into said tank near the bottom thereof; a valve for controlling the flow of water through said pipe; a solenoid arranged to operate said valve; and a relay, responsive to variations in the current flowing between said tank and said electrode, for controlling said solenoid.

2. In a dehydrator a tank in which a body of water is maintained; an electrode suspended in a body of emulsion in said tank above said body of water; means for impressing an electro-motive force between said body of water and said electrode; and means for regulating the distance between the surface of said body of water and said electrode.

3. In a dehydrator a tank in which a body of water is maintained; an electrode suspended in a body of emulsion in said tank above said body of water; means for impressing an electro-motive force between said body of water and said electrode; a water outlet pipe by means of which the surface of said body of water may be lowered; and a valve for regulating the rate of flow of said water through said pipe.

4. In a dehydrator a tank in which a body of water is maintained; an electrode suspended in a body of emulsion in said tank above said body of water; means for impressing an electro-motive force between said body of water and said electrode; a water outlet pipe by means of which the surface of said body of water may be lowered; a valve in said pipe; and means responsive to variations in currents flowing between said electrode and the surface of said body of water for regulating the height of said surface.

5. In a dehydrator a tank in which a body of water is maintained; an electrode suspended in a body of emulsion in said tank above said body of water; means for impressing an electro-motive force between said body of water and said electrode; a water outlet pipe by means of which the surface of said body of water may be lowered; a valve in said pipe; an electro-responsive mechanism for opening and closing said valve; and a relay, responsive to variations in the electric current flow between said electrode and said body of water and said tank for actuating said electro-responsive mechanism.

6. In a dehydrator a tank in which a body of water is maintained; an electrode suspended in a body of emulsion in said tank above said body of water; means for impressing an electro-motive force between said body of water and said electrode; a water outlet pipe by means of which the surface of said body of water may be lowered; a valve in said pipe; an electro-responsive mechanism for opening and closing said valve; and a relay, responsive to variations in the electric current flow between said electrode and said body of water and said tank for actuating said electro-responsive mechanism to raise and lower the level of the surface of said body of water to maintain a constant current flow between said electrode and said body of water and said tank.

7. In a dehydrator a cylindrical tank, an electrode suspended in said tank, said electrode being in the form of a cylinder concentric with said tank and having a horizontal bottom, means for delivering an emulsion into said tank, means for withdrawing clean oil from the top of said tank, means for impressing an electromotive force between said cylinder and said tank so that a dehydrating action can take place therebetween, the separated water falling into the bottom of said tank, and means for maintaining said water at a suitable height to form a secondary field with the bottom of said electrode.

8. In a dehydrator a cylindrical tank, an electrode suspended in said tank, said electrode being in the form of a cylinder concentric with said tank and having a horizontal bottom, means for delivering an emulsion into said tank, means for withdrawing clean oil from the top of said tank, means for impressing an electromotive force between said cylinder and said tank so that a dehydrating action can take place therebetween, the separated water falling into the bottom of said tank, a water outlet pipe through which said water is withdrawn, a valve controlling the flow of water therethrough, and means for opening said valve whenever the current flowing between said electrode and said tank exceeds a predetermined amount.

9. In a dehydrator an electrode immersed in the emulsion to be treated, a body of water below said electrode, means for impressing an electromotive force between said electrode and said body of water so that electric current will flow therebetween, a water outlet pipe through which said water may be discharged, a valve in said pipe, and means for opening and closing said valve as said current rises or falls below predetermined values.

In testimony whereof, I have hereunto set my hand at Los Angeles, California, this 1st day of July, 1919.

FORD W. HARRIS.